Aug. 18, 1942.   C. J. DONALDSON   2,293,642
ADVERTISING RACK FOR MOTOR VEHICLES
Filed Jan. 18, 1941   2 Sheets-Sheet 1
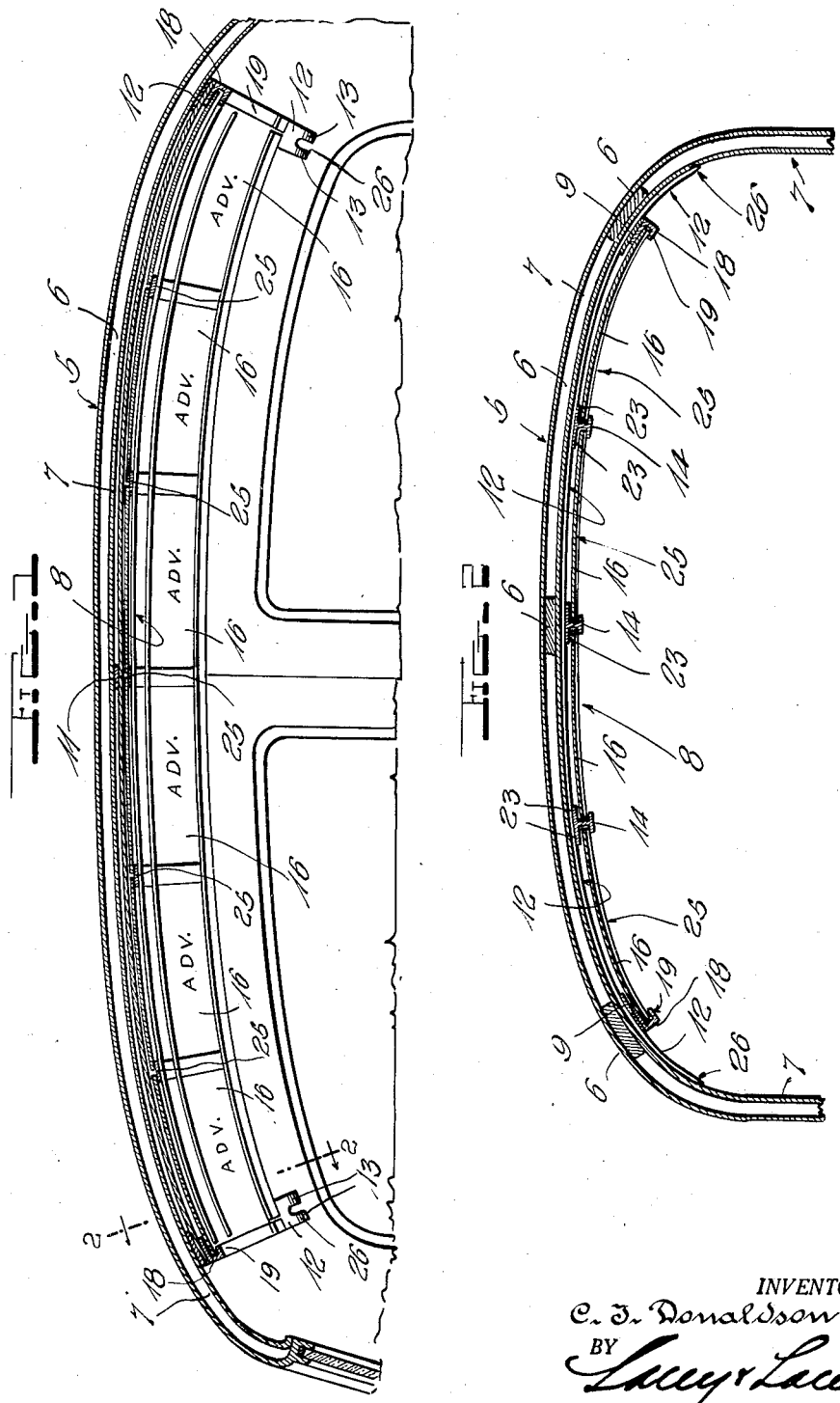
INVENTOR.
C. J. Donaldson,
BY Lacey & Lacey,
Attorneys

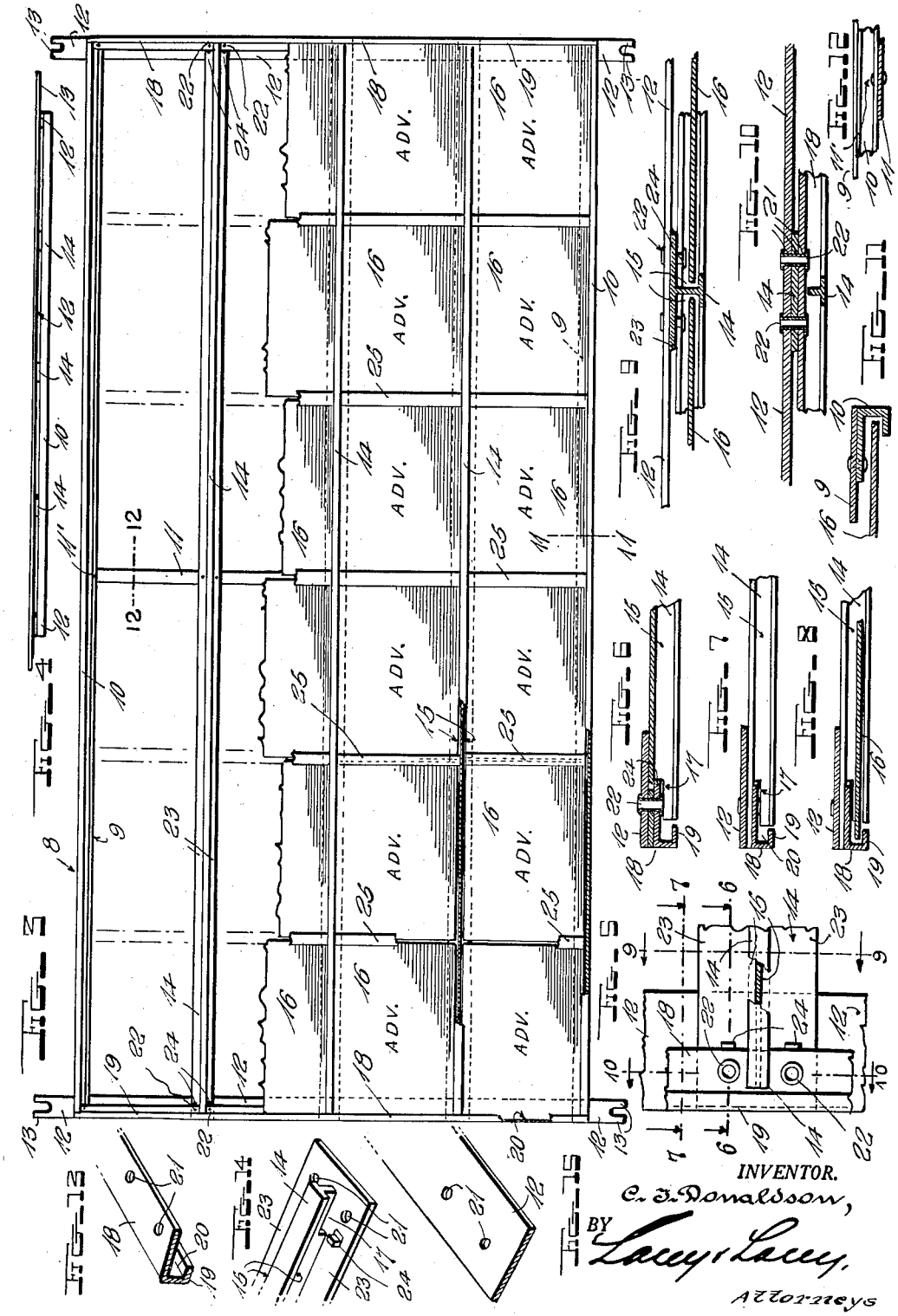

Patented Aug. 18, 1942

2,293,642

UNITED STATES PATENT OFFICE 2,293,642

ADVERTISING RACK FOR MOTOR VEHICLES

Courtly J. Donaldson, Jacksonville, Fla.

Application January 18, 1941, Serial No. 375,057

9 Claims. (Cl. 40—129)

This invention relates to display apparatus and more particularly to a rack or frame for displaying advertising matter in taxicabs, buses and other public conveyances.

The object of the invention is to provide a display apparatus, the construction of which is such that the component parts thereof may be readily assembled within the tonneau of a taxicab or other motor vehicle and the assembled structure positioned as a unit against the ceiling of the vehicle so as effectively to display advertising matter carried thereby.

A further object of the invention is to provide a card display apparatus which will fit the ceiling of any type or style of motor vehicle without necessitating any structural changes therein and in which the card-receiving compartments are of uniform shape and size so as to permit the use of standard size display cards.

A further object is to provide a normally flat card-supporting rack or frame formed of resilient material and adapted to be bowed or flexed transversely to conform to the contour of the ceiling of a vehicle and supported in position thereon by the inherent resiliency of said frame.

A further object is to provide the opposite ends of the card-supporting rack or frame with flat transversely disposed resilient foundation bars to which the frame member is riveted or otherwise permanently secured, said foundation bars being provided with terminal fingers which yieldably grip the adjacent walls of the vehicle when the frame is sprung into place and serve to prevent accidental displacement thereof and also to prevent rattling or vibration of the frame when the vehicle is traveling over rough uneven roads.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a longitudinal sectional view of the top of a taxicab showing the improved card-supporting frame or rack installed in position on the ceiling thereof, Figure 2 is a transverse sectional view taken on the line 2—2 of Figure 1, Figure 3 is a top plan view of the frame or rack before the same is bowed or flexed and sprung into position on the ceiling of a vehicle, Figure 4 is an end view of Figure 3, Figure 5 is an enlarged top plan view, partly in section, of one of the end joints of the frame, Figure 6 is a transverse sectional view taken on the line 6—6 of Figure 5, Figure 7 is a similar view taken on the line 7—7 of Figure 5, Figure 8 is a similar view with one of the advertising cards in position on the rack, Figure 9 is a vertical sectional view taken on the line 9—9 of Figure 5, Figure 10 is a vertical sectional view taken on the line 10—10 of Figure 5, Figure 11 is a transverse sectional view taken on the line 11—11 of Figure 3, Figure 12 is a transverse sectional view taken on the line 12—12 of Figure 3, Figure 13 is a detail sectional perspective view of one of the U-shaped end bars, Figure 14 is a detail perspective view of the end portion of one of the H-shaped intermediate bars, and Figure 15 is a perspective view of a portion of one of the foundation bars.

The improved advertising apparatus may be used in connection with any standard make or type of closed car, and by way of illustration is shown applied to a taxicab of conventional construction, in which 5 designates the top, 6 the transverse bows or braces and 7 the ceiling.

The device comprises a normally flat substantially rectangular resilient card-supporting rack or frame, indicated in general by the numeral 8, and this frame is preferably formed of a plurality of longitudinal and transverse resilient bars of the proper shape and cut to the desired length so as to permit said bars to be assembled and secured together within the tonneau of the vehicle by the owner thereof or by an unskilled laborer and said frame positioned within the top of the vehicle in the manner hereinafter more fully described.

The frame 8 comprises spaced longitudinally disposed flat side bars 9 to which are secured substantially U-shaped channel bars 10, said bars being connected by a flat intermediate transverse bar 11, the parts being riveted together, as indicated at 11'. Arranged at the opposite ends of the frame 8 are flat resilient foundation bars 12, the ends of which project slightly beyond the adjacent side bars 9 and are bifurcated to form resilient gripping fingers 13 adapted to yieldably bear against the adjacent walls of the vehicle for the purpose of holding the frame in position thereon.

The frame 8 is provided at spaced intervals with longitudinal disposed bars 14 preferably substantially H-shaped in cross section to provide grooves or channels 15 for the reception of advertising cards, indicated at 16. The webs of the H-shaped bars 14 are cut away at 17 to accommodate auxiliary end bars 18, and these end bars are provided with substantially U-shaped portions 19 defining channels 20 adapted to receive the ends of the adjacent advertising cards.

The transverse foundation bars 12, H-shaped bars 14 and auxiliary end bars 18 are provided with openings 21 adapted to register with each other to permit the insertion of tubular rivets 22 for the purpose of permanently holding the parts together. The H-shaped longitudinal bars 14 are provided with relatively wide base portions 23 through which the openings 21 extend and the metal constituting the base portions 23 near the openings 21 is preferably bent or struck upwardly to form stop lugs 24 which bear against the inner edges of the adjacent end bars 18, as best shown in Figure 6 of the drawings.

The stop lugs 24 are preferably arranged in transverse alinement with the rear wall of the cut away portion 17 and by engagement with the end bars 18 serve to aline the openings 21 in the several bars when assembling the frame into shape so as to permit the easy insertion of the tubular rivets 22.

It will be noted that, inasmuch as the longitudinal side bars 9 are parallel with each other and the intermediate H-shaped bars likewise parallel with each other as well as the end bars 18, the card-receiving compartments are of uniform size throughout the entire area of the rack, thus permitting the use of standard size display cards which may be interchanged at will without the necessity of cutting the cards to fit the various card-receiving compartments. It will also be noted that the outer faces of the H-shaped bars 14 are disposed in alinement with the outer faces of the U-shaped members 19 of the end bars 18, as best shown in Figures 6 and 8 of the drawings, so as to permit the display cards at the opposite ends of the frame to be guided within said U-shaped members. As a means for retaining the display cards 16 within their compartments, there is provided a plurality of flat resilient dividing strips 25 which fit within the channels 15 of the longitudinal bars and overlap the adjacent ends of said display cards. These resilient dividing strips 25 are freely separable from the supporting frame or rack and may be readily inserted within the channels 15 by bowing or flexing said strips, as will be readily understood.

As previously stated, the several bars comprising the card-supporting rack or frame are made in the proper shape and length in a machine shop, factory or other place and delivered to the user in a compact bundle. A workman then assembles these bars within the tonneau of the taxicab or other vehicle with the lugs 24 engaging the ends of the side bars 18 and in which position the openings in the side bars 18, H-shaped bars 14 and foundation bars 12 will register so as to permit the insertion of the tubular rivets 22, the heads of which are then upset with a suitable hand tool. The frame as a unit is then bowed or flexed transversely so that the foundation bars 12 will conform approximately to the configuration of the ceiling and as soon as the flexing pressure on the frame is removed, said frame will tend to flatten out or resume its normal flat position and in doing so the foundation bars will frictionally engage the ceiling of the taxicab with the terminal lips 13, which are preferably bent inwardly at 26, yieldably engaging the adjacent walls of the automobile, thereby holding the frame in position within the vehicle without the employment of screws, rivets, clamps or other fastening devices. After the rack or frame is in position on the ceiling of the motor vehicle, the advertising cards may be readily inserted within the grooves 15 by flexing the cards and in which position they will be retained by the dividing strips 25. By exerting an inward pressure on the projecting ends of the foundation bars 12, the gripping fingers will be released and the card-supporting frame may then be moved downwardly within the cab without in any manner marring or otherwise disfiguring the ceiling or walls thereof.

From the foregoing description, it is thought that the construction and operation of the device will be readily understood by those skilled in the art and further description is deemed unnecessary.

It will further be understood that the devices may be made in different sizes and shapes and constructed of any suitable material without departing from the spirit of the invention.

Having thus described the invention, what is claimed as new is:

1. The combination with a curved supporting wall, of a normally flat resilient card-supporting frame including spaced transversely disposed resilient foundation bars having their ends projecting laterally beyond the adjacent sides of the frame and their terminals bifurcated to form gripping members, said frame being adapted to be flexed both longitudinally and transversely to conform to the shape of said wall and detachably retained in position thereagainst by yieldable engagement of said gripping members with the adjacent surface of the supporting wall incident to the inherent spring tendency of the frame to return to its normal flat condition.

2. The combination with a curved supporting wall, of a normally flat resilient frame provided with spaced compartments, transversely disposed resilient foundation bars disposed at the opposite ends of the frame and having projecting portions constituting gripping members, said frame being adapted to be flexed both longitudinally and transversely to conform to the shape of said wall and retained in position thereagainst by engagement of the gripping members with said wall incident to the inherent spring tendency of the frame to return to its normal flat condition, display cards fitting within the compartments, and division strips overlapping the ends of adjacent cards.

3. The combination with a curved supporting wall, of a normally flat resilient card-supporting frame including flat longitudinal side bars, channel bars secured to the flat side bars, substantially U-shaped end bars connecting the side bars, intermediate substantially H-shaped bars connecting the U-shaped end bars and provided with card-receiving channels, display cards removably fitted within the channels, resilient division strips overlapping adjacent display cards with their ends fitting within the channels, and resilient foundation bars secured to the H-shaped bars and adapted to be flexed as a unit with the main body of the frame for yieldable engagement with said supporting wall, said frame being retained in position on the supporting wall by spring pressure exerted on said wall by the frame incident to the tendency of the frame to return to its normal flat condition.

4. A card-supporting rack comprising a normally flat resilient frame including spaced longitudinal side bars connected by end bars and an intermediate resilient brace, flat resilient foundation bars secured to the end bars, intermediate substantially H-shaped longitudinal bars connected with the end bars and provided with channels for the reception of display cards, said H-shaped bars being provided with laterally extending stop lugs for engagement with said end bars, the foundation bars and main body of the frame being adapted to be flexed as a unit for yieldable engagement with a curved supporting wall.

5. A rack-supporting frame comprising spaced longitudinal side bars connected by end bars, a resilient brace extending between the side bars, intermediate substantially H-shaped longitudinal bars connecting the end bars and having portions thereof cut away to accommodate said end bars, flat resilient foundation bars secured to the frame at the opposite end thereof, said end bars, foundation bars and H-shaped bars being provided with registering openings, stop lugs extending laterally from the H-shaped bars for engagement with the adjacent end bars to permit registration of said openings, and fastening devices extending through the registering openings, said foundation bars together with the main body of the frame being adapted to be flexed as a unit for yieldable engagement with a curved supporting wall.

6. A card-supporting rack comprising flat longitudinal side bars, auxiliary side bars secured thereto and provided with card-receiving channels, substantially U-shaped end bars connecting said H-shaped bars and side bars, flat resilient foundation bars secured to the end bars and said H-shaped bars, the opposite ends of the foundation bars being projected laterally beyond the side bars of the frame to form gripping members, display cards removably fitted within the channels, and resilient dividing strips having their opposite ends detachably engaging the adjacent channels and overlapping the adjacent display cards, said foundation bars together with the main body of the frame being adapted to be flexed as a unit to conform to a curved supporting wall with the projecting ends of the foundation bars yieldably engaging said supporting walls.

7. A card rack supporting frame comprising a normally flat substantially rectangular resilient frame including flat longitudinal side bars connected by substantially U-shaped end bars, substantially U-shaped auxiliary side bars secured to the flat side bars, substantially H-shaped intermediate longitudinal bars connecting the end bars and defining card-receiving channels, the channels of the intermediate longitudinal bars being disposed in alinement with the channels formed by the U-shaped end bars, said frame being provided with a plurality of compartments of uniform size and adapted to receive display cards with portions thereof fitting in the adjacent channels, stop lugs struck laterally from the H-shaped bars for engagement with the end bars, and flat resilient foundation bars secured to the frame at the opposite ends thereof and provided with portions projecting laterally beyond the side bars to form gripping members for engagement with a curved supporting wall when the foundation bars and main body of the frame are flexed as a unit to conform to said supporting wall.

8. A card-supporting rack comprising a normally flat frame including spaced longitudinal side bars connected by end bars and an intermediate brace, foundation bars secured to the end bars, intermediate substantially H-shaped longitudinal bars connected with certain of said bars and provided with channels for the reception of display cards, said H-shaped bars being provided with stop lugs for engagement with said end bars, the foundation bars and main body of the frame being adapted to be flexed as a unit for yieldable engagement with a curved supporting wall.

9. A card-supporting rack comprising a normally flat resilient frame having a plurality of compartments for the reception of display cards, and resilient foundation bars secured to the opposite ends of the frame and having their end portions projecting laterally beyond the adjacent sides of the frame and provided with gripping teeth, said frame being adapted to be flexed longitudinally and transversely as a unit to conform to a curved supporting wall and held in position thereagainst by spring pressure exerted on said gripping teeth incident to the tendency of the frame to return to its normal flat condition.

COURTLY J. DONALDSON.